Oct. 25, 1966  T. KONECHECK  3,281,096
AIRCRAFT GUIDING CONTROL

Filed Nov. 24, 1964  2 Sheets-Sheet 1

INVENTOR.
THOMAS KONECHECK
BY
*William J. Ruano*
his ATTORNEY

Oct. 25, 1966 T. KONECHECK 3,281,096
AIRCRAFT GUIDING CONTROL
Filed Nov. 24, 1964 2 Sheets-Sheet 2

INVENTOR.
THOMAS KONECHECK
BY
William J. Ruano
his ATTORNEY

United States Patent Office 3,281,096
Patented Oct. 25, 1966

3,281,096
AIRCRAFT GUIDING CONTROL
Thomas Konecheck, Box 355, Rt. 18, Atlasburg, Pa.
Filed Nov. 24, 1964, Ser. No. 413,546
6 Claims. (Cl. 244—51)

This invention relates to a control system for guiding the movements of an airplane and, more particularly, to a control or guiding system for effecting right and left movements as well as climbing and lowering movements of the plane.

In the past, the vertical stabilizer and rudder, also the horizontal stabilizer and elevator, have been used as control surfaces, also the propeller was mounted on the front of the plane which involved high drag and low propeller efficiency as well as danger to persons walking by to mount the plane.

An object of my invention is to eliminate the above-mentioned high drag and low propeller efficiency and to provide a novel control system involving a propeller and shroud ring which effects lifting and lowering, as well as right or left guiding movements of the plane and which may be operated by conventional control means, such as a conventional air control used for the rudder and elevator on the tail and ailerons on the wings, also to place the propeller in the rear instead of the front of the plane to promote safety.

A more specific object of my invention is to provide an aircraft control system in which a propeller mounted in a shroud or ring may be moved, as an assembly, by a joint simulating a universal type joint enabling pivotal movement in a vertical plane and in a horizontal plane so as to direct the air current in different directions and thus provide a very high degree of flexibility in controlling the direction of movement of the aircraft to the right or left, as well as up and down.

Other objects and advantages of the invention will become more apparent from the following description taken with the accompanying drawings wherein:

FIG. 5 is an enlarged, fragmentary, perspective view of the rear portion of FIG. 1 as viewed from the aircraft.

Figure 1:
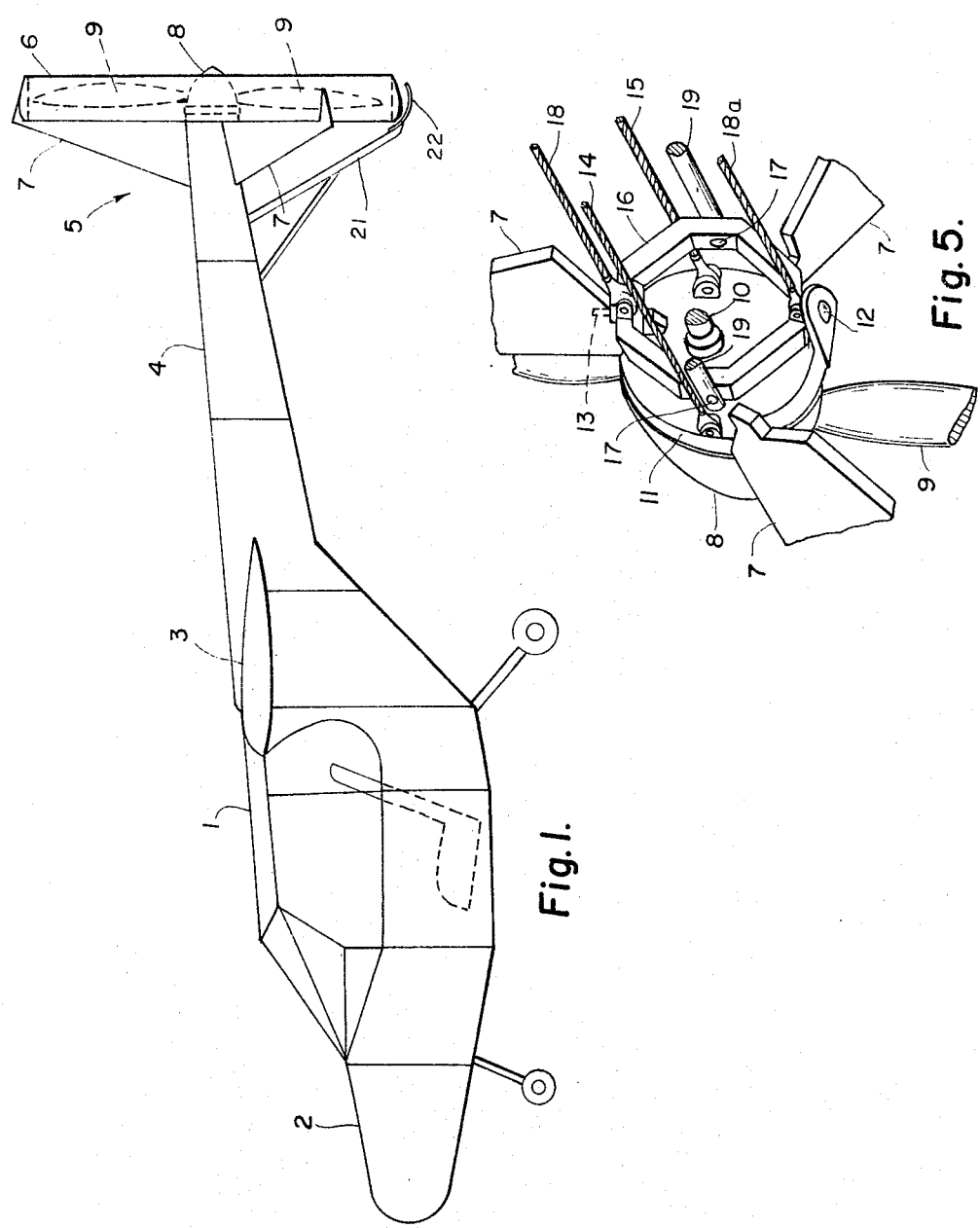
FIG. 1 is a side view of an aircraft on the tail of which is mounted a propeller assembly and control system embodying the present invention for controlling the direction of movement of the aircraft.
Figure 2:
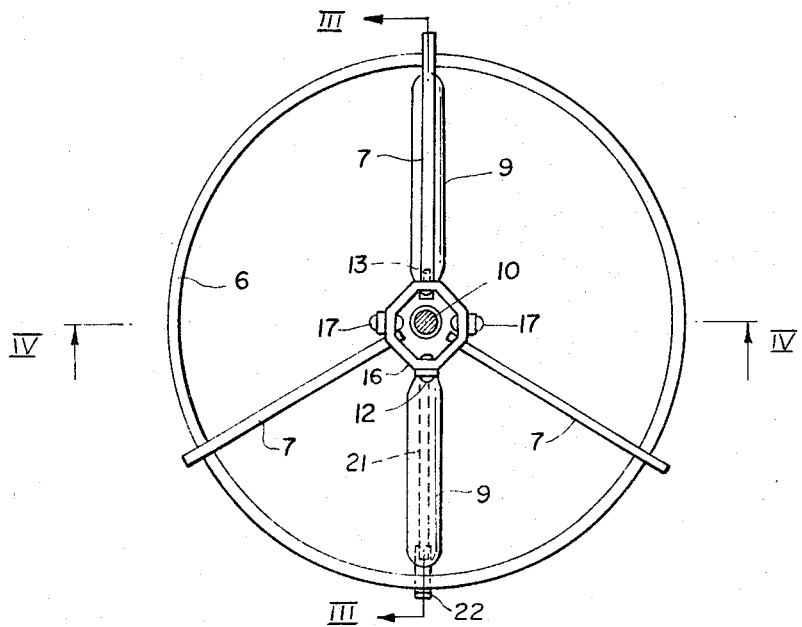
FIG. 2 is an enlarged, rear view of the propeller assembly and universal control unit.

Referring more particularly to FIG. 1 of the drawing, numeral 1 denotes the top portion, numeral 2, the front portion, numeral 3, the wing portion, and numeral 4, the tail portion of an aircraft of the type illustrated. On the rear end of the tail portion there is mounted a propeller assembly and universal control system, generally denoted by numeral 5, and comprising a ring or shroud 6 rigidly supported by radial struts 7, as will appear more clearly in FIG. 2. The struts 7 are rigidly secured to support 11 on which is rotatably mounted a propeller spinner or cone 8 to which are attached propeller blades 9 as shown more clearly in FIGS. 3 and 4.

Figures 3, 4:
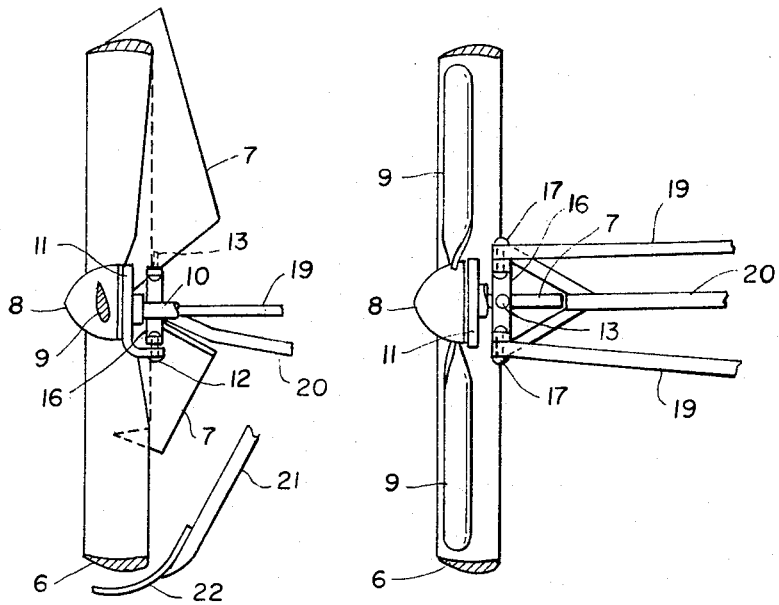
FIG. 3 is a cross-sectional view taken along line III—III of FIG. 2.
FIG. 4 is a view, similar to FIG. 3, but taken at right angles to line III—III of FIG 2.

A universal type of movement of the propeller assembly, comprising propeller blades 9, spinner 8 and shroud 6, is provided by a control system embodying the present invention and shown more clearly in FIGS. 3, 4, and 5. The support 11 and struts 7 affixed thereto may be turned slightly about a vertical axis extending through hinge pins 12 and 13 of yoke 16 and such movement may be effected by pulling on cable 14 or 15 attached to diametrically opposite sides of support 11. This will effect steering movements to the left or right of the plane, that is to say, by pulling cable 15 or 14, the propeller assembly, including ring 6, is moved about a vertical axis in one direction or an opposite direction to provide left and right steering movements.

Yoke 16 of substantially rectangular or polygonal outline, provides movement also in a vertical plane by means of a second pair of pins at 17 pivotally mounting yoke 16 to the longerons or frame elements 19 of the aircraft. Thus, yoke 16 is also tiltable about a horizontal axis extending through pins 17 which tilting is effected by pulling on cable 18 or 18a. This, of course, will effect upward or downward pivotal movement in a vertical plane of support 11, propeller blades 9 and ring 6 so as to cause the plane to lower or lift. Thus, by a combination of movements of cable pairs 14 and 15 and 18 and 18a, a universal type of movement of the propeller assembly including ring 6 is effected so as to provide a great degree of maneuverability. The cable pairs 14 and 15 and 18 and 18a may be controlled in the same manner as the conventional aircraft control of the rudder and elevator on the tail and ailerons on the wings.

In the operation, pulling of the conventional cabin stick or wheel (not shown) will pull on cable 18 about the horizontal axis through pins which forces the tail down and the nose 2 of the airplane rises above the horizon causing the airplane to climb much the same way as caused by a conventional elevator. The airplane may be similarly made to dive by pulling on cable 18a which effects lifting of the tail assembly upwardly.

For the airplane to turn left, there is required a co-ordinated pressure of the left aileron, as used on all conventional planes, and the left foot pedal which is the rudder on conventional planes. A pull on cable 15 causes movement of a propeller assembly in one direction about a vertical axis and a pull by cable 14 causes pivotal movement about a vertical axis in the opposite direction, so as to provide selectively right or left steering movements.

A right turn is done reversely using the right aileron and pedal to pull control cable 14 which moves the control through a vertical axis extending through hinge pins 13 and 12. This causes the tail to move left as the pilot sees the nose of the airplane moving to his right.

The drive motor (not shown) is located inside and forwardly of tail portion 4. To prevent damage to ring 6 when landing, and in the event the tail lands first, there is provided a guard 22 supported by the frame 21 connected to tail portion 4.

If desired, a universal joint may be substituted for the joint shown in FIG. 5 to enable tilting in more than two planes.

Thus, it will be seen that I have provided an efficient control system for controlling the direction of movement of aircraft to provide a universal type of movement of the propeller assembly, including a propeller and shroud assembly which is pivotally mounted in a manner so as to give left and right movement, as well as lifting and lowering movement, of the plane in any selected amount, and which substantially increases propeller efficiency and eliminates abnormal drag by using the ring as a controlling surface, also which increases safety by mounting the propeller and ring on the rear instead of the front of the aircraft, having the added advantages of increasing visibility or angle of view of the pilot.

While I have illustrated and described a single specific embodiment of my invention, it will be understood that this is by way of illustration only, and that various changes and modifications may be made within the contemplation of my invention and within the scope of the following claims.

I claim:
1. In an airplane, the combination of propulsive propeller means including a propeller and a non-rotatable stabilizer ring encircling said propeller and tiltably mounted on the rear end of said airplane, and control means for tilting said stabilizer ring and propeller as a unit for controlling the direction of flight of the airplane.

2. In an airplane as recited in claim 1, wherein said control means includes a pivotal mounting for tilting said stabilizer ring and propeller as a unit selectively in a vertical direction or a horizontal direction to guide the airplane to the right or left and to effect lifting or lowering movement of the airplane.

3. In an airplane, a support tiltably mounted on the rear end of said airplane propeller means pivotally carried by said support, a stabilizer ring, radially extending struts rigidly mounting said ring to said support means for tiltably mounting said ring, propeller and support as a unit on the rear end of said airplane, and control means including said propeller means for selectively effecting tilting movements of said ring and propeller, as a unit, about a vertical axis or about a horizontal axis to effect steering to the right or left, and to effect lifting or lowering movements of the airplane.

4. In an airplane, a support tiltably mounted on the rear end of said airplane propeller means pivotally carried by said support, a stabilizer ring, radially extending struts rigidly mounting said ring to said support, means for tiltably mounting said ring, propeller and support as a unit on the rear end of said airplane, said means comprising a yoke in the form of a loop pivotally connected to the rear end of the airplane and tiltable about a horizontal axis, said yoke including pivotal means connected to said support and ring so as to provide relative pivotal movement between said yoke and support about a vertical axis, steering control means for tilting said support and propeller as a unit about said vertical axis to effect selective right and left movements of the airplane, and control means for tilting said yoke about said horizontal axis to effect selective lifting and lowering movements of the airplane.

5. An airplane as recited in claim 4 wherein said steering control means includes linkage means connected to diametrically opposite sides of said support in a horizontal direction, and wherein said last named control means includes linkage means connected to diametrically opposite sides of said yoke in a vertical direction.

6. An airplane as recited in claim 5 wherein said linkage means comprise cables.

References Cited by the Examiner
UNITED STATES PATENTS

| | | | |
|---|---|---|---|
| 1,851,764 | 3/1932 | Hahn | 244—7 |
| 1,852,927 | 4/1932 | Hall | 244—51 |
| 2,433,641 | 12/1947 | Young | 244—51 |
| 2,478,847 | 8/1949 | Stuart | 244—7 |
| 2,705,935 | 4/1955 | Peterson | 244—51 X |
| 2,991,026 | 7/1961 | Nelson et al. | 244—56 X |
| 3,081,964 | 3/1963 | Quenzler | 244—51 X |
| 3,083,935 | 4/1963 | Pusecki | 244—7 X |

MILTON BUCHLER, *Primary Examiner.*

B. BELKIN, *Assistant Examiner.*